Figure 1:
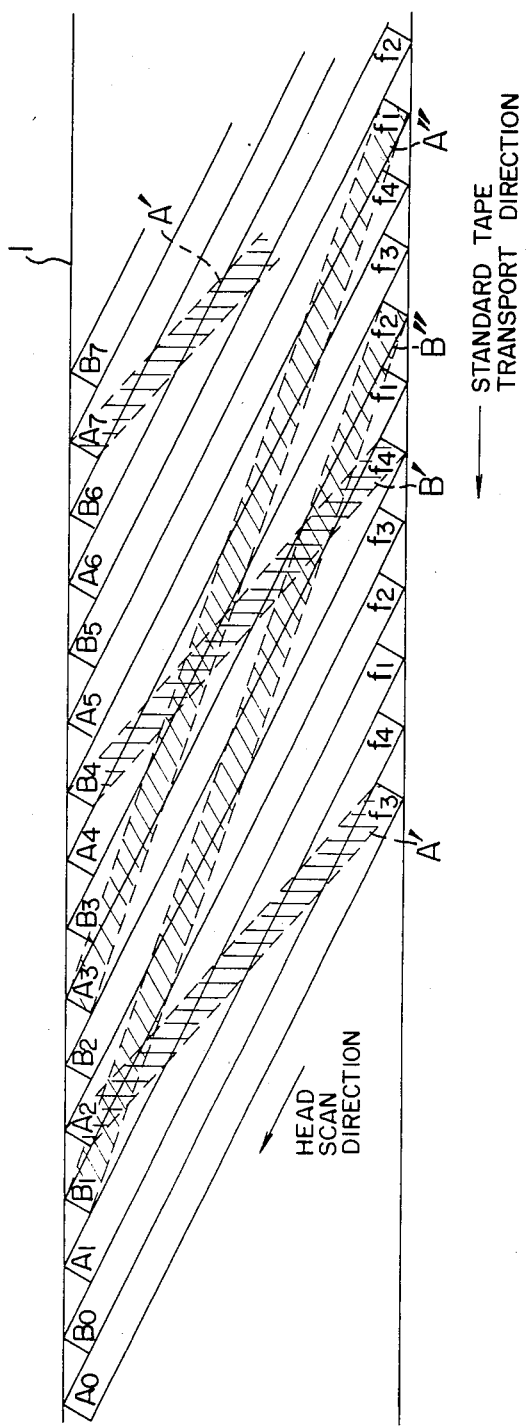

United States Patent [19]

Furuhata et al.

[11] Patent Number: 4,568,986
[45] Date of Patent: Feb. 4, 1986

[54] VARIABLE SPEED PLAYBACK CONTROLLER FOR A VIDEO TAPE RECORDER

[75] Inventors: Takashi Furuhata; Kenji Satoh, both of Yokohama; Yoshiyuki Azuma; Yasuhide Mogi, both of Katsuta, all of Japan

[73] Assignee: Hitachi, Ltd., Tokyo, Japan

[21] Appl. No.: 518,688

[22] Filed: Jul. 29, 1983

[30] Foreign Application Priority Data

Jul. 30, 1982 [JP] Japan .................. 57-131917

[51] Int. Cl.⁴ .................. H04N 5/782; G11B 5/00; G11B 27/00
[52] U.S. Cl. .................. 360/10.2; 360/10.1; 360/10.3; 360/73; 358/323
[58] Field of Search .............. 358/338, 323; 360/10.1, 360/10.2, 10.3, 69, 70, 71, 73, 77, 78

[56] References Cited

U.S. PATENT DOCUMENTS 3,959,819 5/1976 Kubo .................. 360/10.1 X
4,318,140 3/1982 Shigeta .................. 360/10.3

*Primary Examiner*—Robert L. Richardson
*Attorney, Agent, or Firm*—Antonelli, Terry & Wands

[57] ABSTRACT

A magnetic tape transport controller for a magnetic recording and reproducing apparatus in which a pilot signal for tracking control having four different frequencies is recorded on a magnetic tape by a rotary magnetic head and the magnetic tape is transported in a playback mode at a different tape speed than that in a recording mode. The tape transport controller has means for detecting an amplitude change of a specific one of signals derived by frequency-converting a reproduced pilot signal and controlling the tape speed such that the frequency of the amplitude change is maintained at a predetermined frequency. It also has a phase control loop to control the tape speed such that a phase of the specific signal coincides with a phase of a reference signal. In the playback mode in which the tape is transported at the different speed than that in the recording mode, frequencies of a local pilot signal used to frequency-convert the reproduced pilot signal are switched in the opposite order to that of the switching of the frequencies in the recording mode. A detection circuit which detects a difference between two frequency converted signals of different frequencies and amplifies the difference inverts a polarity of an output signal for each track switching in a standard speed playback mode and does not invert the polarity in a variable speed playback mode.

5 Claims, 5 Drawing Figures

VARIABLE SPEED PLAYBACK CONTROLLER FOR A VIDEO TAPE RECORDER

The present invention relates to a video signal recording and reproducing apparatus which uses a magnetic tape such as a video tape recorder, and more particularly to a variable speed playback controller for enabling playback of signals recorded on a magnetic tape at a different tape speed than a recording speed.

In a video tape recorder which uses a rotary head to record and playback a video signal and utilizes a control signal recorded on a control track of the magnetic tape to control transport of the magnetic tape, when the video signal recorded on the magnetic tape at a standard speed is to be played back at a different speed than the standard recording speed, the magnetic tape transport speed is easily controlled by utilizing the control signal reproduced from the control track. For example, if the video signal is to be played back at a speed which is n (n being an integer) times as large as the standard speed, the tape transport may be controlled such that a frequency of the control signal reproduced from the control track is n times as high as a frequency $f_o$ attained by the playback at the standard speed.

On the other hand, in such a video tape recorder, when the video signal is to be played back at the same tape speed as the standard recording tape speed, the control signal is utilized for so-called tracking control so that the rotary head exactly scans video signal tracks recorded on the magnetic tape. Since a head for recording and reproducing the control signal and the rotary head for recording and reproducing the video signal are usually arranged at different positions on scan paths of the magnetic tape, it is necessary to fix a relative positional relation of those heads among different video tape recorders. If the relative positional relation differs from apparatus to apparatus, the tracking will not be exactly attained when a magnetic tape recorded by one apparatus is reproduced by other apparatus. Since the relative positional relation is determined by a physical positional relation of the rotary head and the control head, dimensional errors of various parts and components are unavoidable when a number of sets are manufactured and hence fine positional adjustment works are necessary.

In order to resolve the above problem, a method which does not utilize the recording and reproduction of the control signal for the tracking control has been proposed. In the proposed method, a pilot signal for controlling the tracking is recorded on the video signal track in superposition to the video signal, and the pilot signal is detected in the playback mode to control the tracking. The pilot signal may comprise four signals of different frequencies which are recorded on respective tracks such that the signals of different frequencies are recorded on adjacent tracks In the playback mode, the tracking is controlled by making use of the reproduced pilot signals. In this method, since the video signal and the pilot signal on the video track are reproduced by the same rotary head, the above problem is avoided.

However, in the apparatus which uses the pilot signal to control the tracking, it is not easy to attain the speed control when the playback tape speed is different from the recording tape speed, as opposed to the apparatus which uses the control signal. As a result, in a home video tape recorder having a variable speed playback function, the pilot signal system has not been widely used.

It is an object of the present invention to provide a controller for a system which uses the pilot signal to control the tracking, which can servo-control the transport speed of the magnetic tape in the variable speed playback with an addition of only a small scale circuit.

In order to achieve the above object, in accordance with the present invention, when the signal is to be reproduced at a different tape speed than a recording tape speed, the pilot signals of four different frequencies are cyclically and repeatedly selected and recorded on sequential tracks of the magnetic tape, local pilot signals having the same four frequencies as those of the recorded pilot signals are sequentially generated in a predetermined order, the pilot signal reproduced from the magnetic tape is frequency-converted by the local pilot frequency, an amplitude of a resulting differential frequency signal is detected, and a servo-control is effected such that a frequency of the detected differential frequency signal is kept constant or a phase thereof is synchronized with a predetermined signal. In detecting the pilot signals, the frequencies of the local pilot signals may be generated in the opposite order to that in the standard tape speed playback to utilize them to frequency-convert the reproduced pilot signals. In this construction, the stability of the detected signals is improved.

Figure 2:
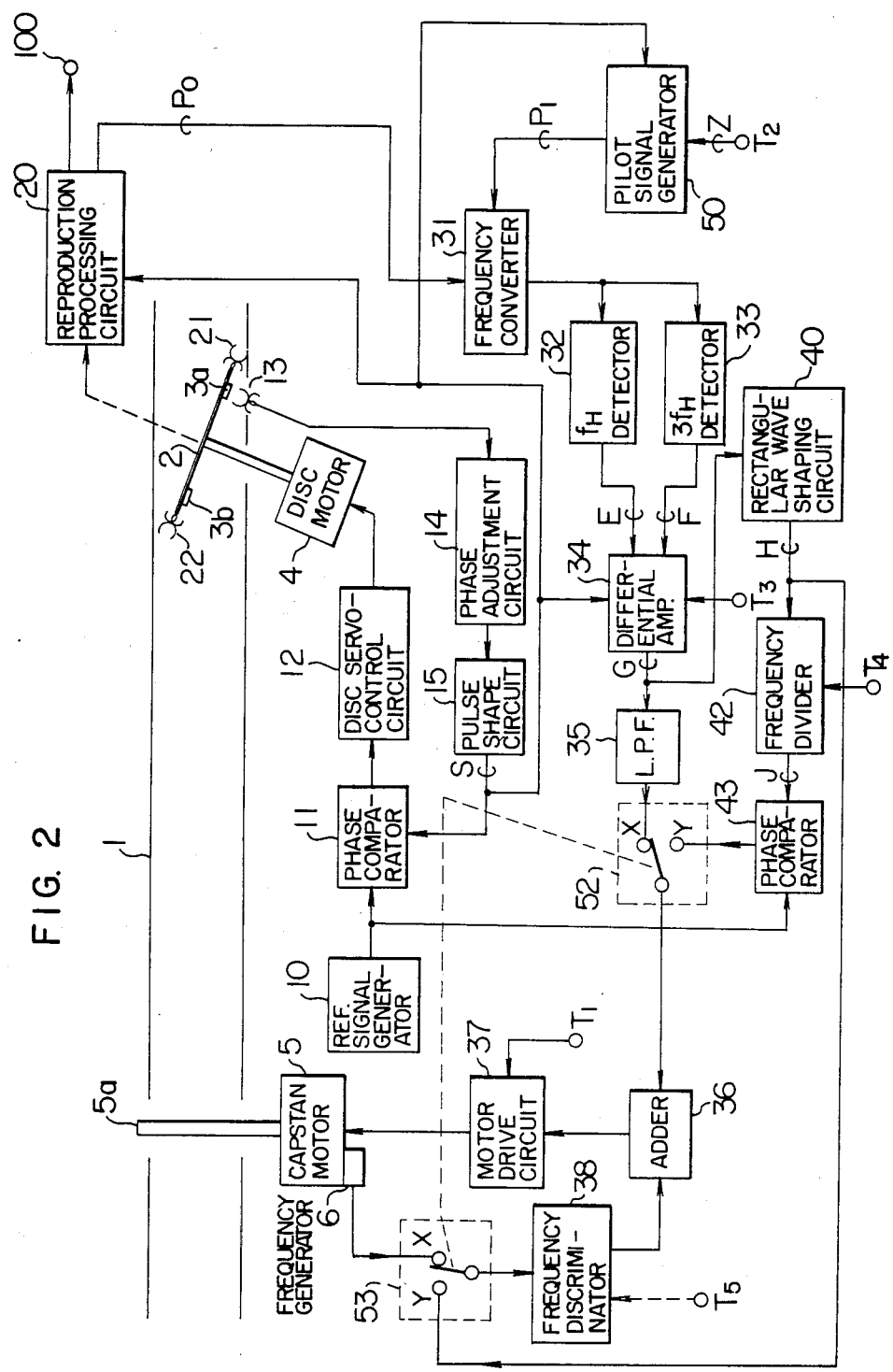
Figure 3:
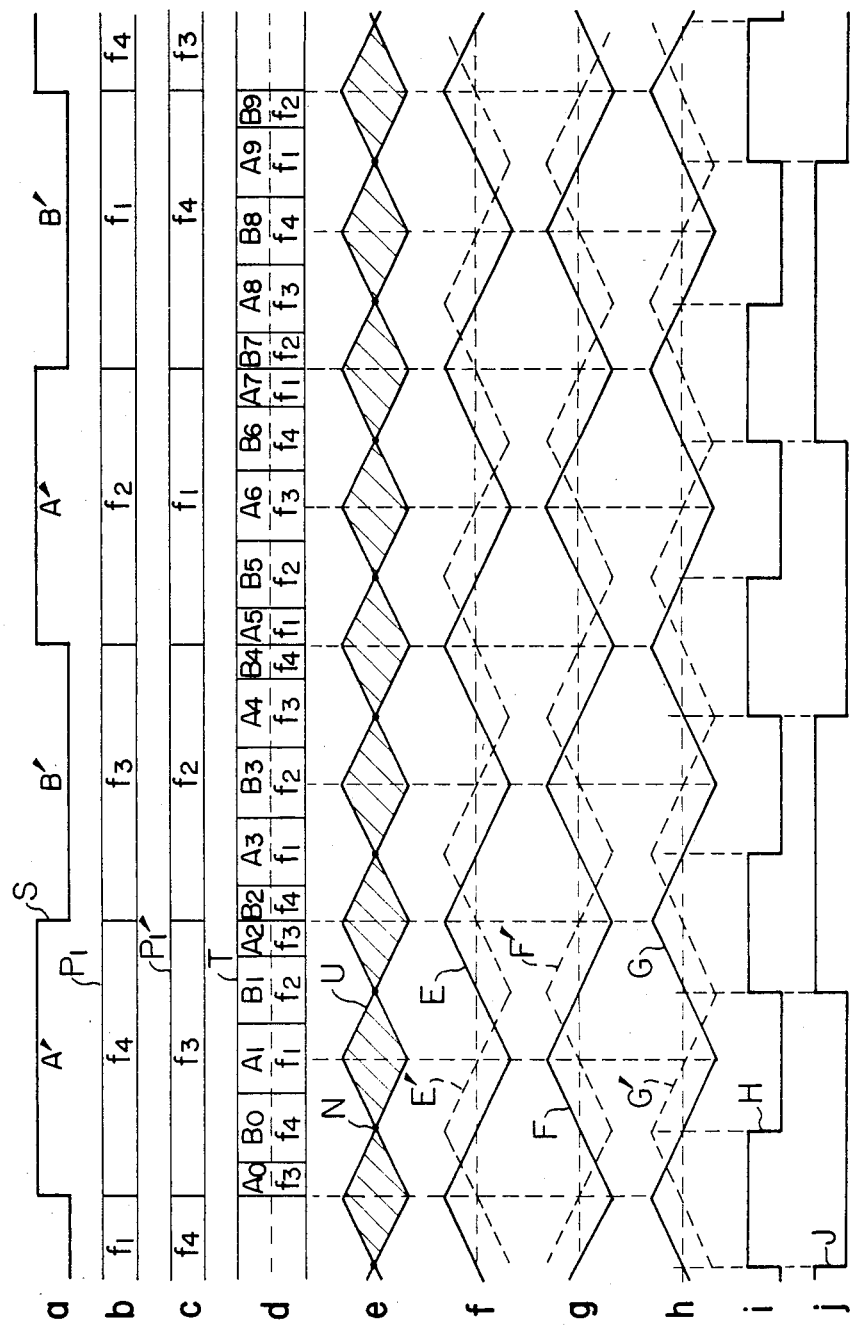
Figure 4:
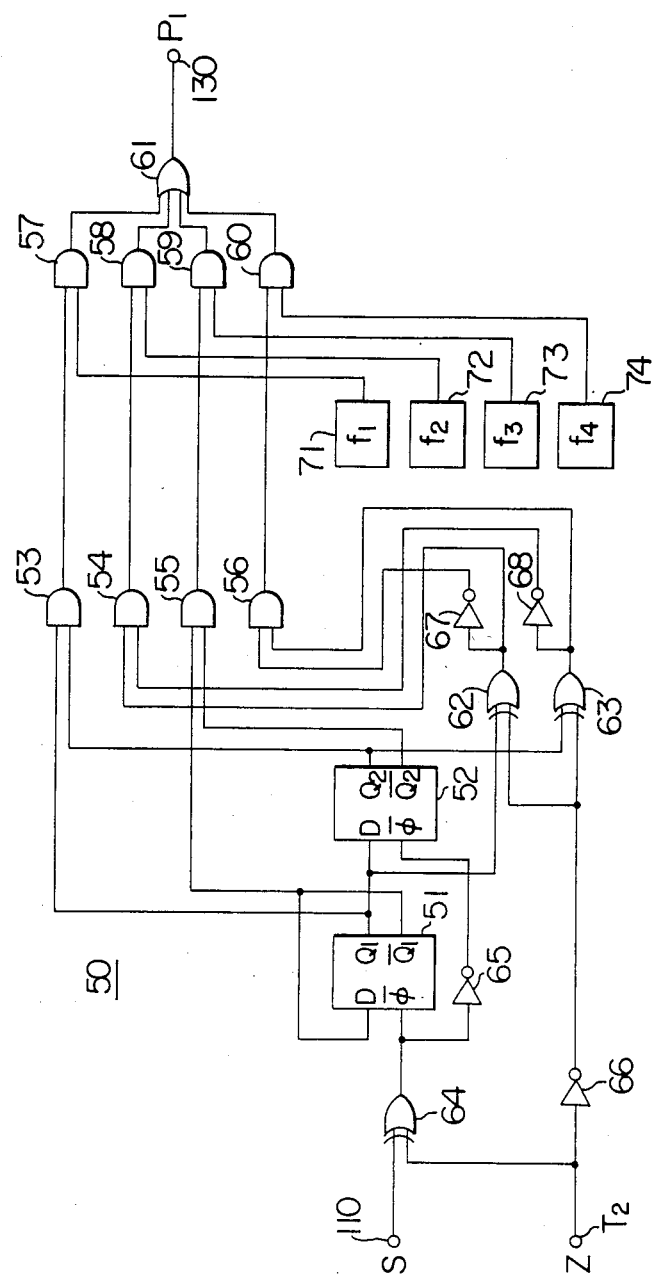
Figure 5:
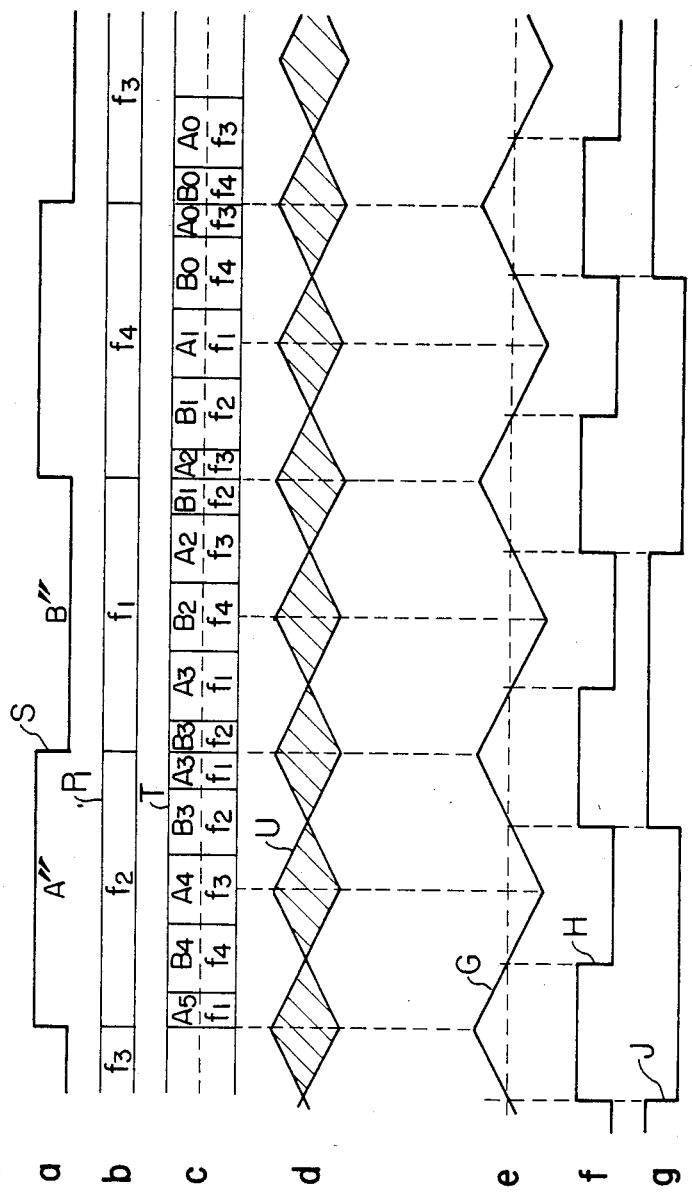

The present invention will be apparent from the following detailed description taken in conjunction with the accompanying drawings, in which:

FIG. 1 shows a relation between a record track pattern on a magnetic tape and a trace locus of a rotary head in a variable speed playback, FIG. 2 is a block diagram of one embodiment of a tape transport controller in accordance with the present invention, FIG. 3, consisting of a–j, shows signal waveforms for illustrating a playback operation when a tape is transported at a speed five times as high as a standard recording speed, FIG. 4 is a block diagram of one embodiment of a local pilot signal generator, and FIG. 5, consisting of a–j, shows waveforms for illustrating a playback operation when the tape is transported reversely at a speed three times as high as the standard recording speed.

FIG. 1 shows a pattern of a record track in a two-head helical scan type video tape recorder, in which pilot signals are recorded in superposition to video signals. Record tracks $A_0, A_1, A_2, \ldots$ and $B_0, B_1, B_2, \ldots$ are formed by alternate recording by two rotary heads. The tracks $A_0, A_1, A_2 \ldots$ are formed by one of the heads and the tracks $B_0, B_1, B_2 \ldots$ are formed by the other head. The two rotary heads are usually arranged to have different azimuth angles of head gaps from each other so that a crosstalk between adjacent tracks in the playback mode is sufficiently small without requiring a guard band between the adjacent tracks as shown in FIG. 1. One field of video signal and the pilot signal are recorded in superposition on each of the record tracks $A_0, B_0, A_1, B_1, \ldots$. The pilot signals of a frequency $f_1$ or $f_3$ are recorded on the tracks designated by A and the pilot signals of a frequency $f_2$ or $f_4$ are recorded on the tracks designated by B. The pilot signals of the frequencies $f_1, f_2, f_3$ and $f_4$ are cyclically and repeatedly recorded on the sequential tracks. In FIG. 1, $f_1$–$f_4$ shown at bottoms of the respective tracks indicate the frequencies of the pilot signals recorded on the respective tracks. The pilot signal frequencies may be set as follows.

$$\left.\begin{array}{l} f_1 = 6.5\, f_H \\ f_2 = 7.5\, f_H \\ f_3 = 10.5\, f_H \\ f_4 = 9.5\, f_H \end{array}\right\} \quad (1)$$

where $f_H$ is a horizontal synchronization frequency of the video signal.

FIG. 2 is a block diagram of one embodiment of a controller for controlling the transport of the magnetic tape in the apparatus of the present invention which plays back such a recorded magnetic tape.

An operation of the circuit of FIG. 2 when the magnetic tape is played back at a standard tape speed is first explained.

A magnetic tape 1 is driven by a capstan 5a which is rotated by a capstan motor 5. Two rotary magnetic heads 21 and 22 are mounted on a disc 2 with an angular difference of 180 degrees from each other and rotated by a disc motor 4. The rotary magnetic heads 21 and 22 may be mounted on a rotary cylinder. Magnets 3a and 3b are mounted on the disc 2 with an angular difference of 180 degrees, and positions of the magnets 3a and 3b as the disc 2 is rotated are detected by a tach. head 13. Since the magnets 3a and 3b are mounted with the angular difference of 180 degrees like the rotary magnetic heads 21 and 22, an output from the tach. head 13 is a pulse signal synchronized with the rotations of the rotary magnetic heads 21 and 22. The pulse signal detected by the tach. head 13 is supplied to a phase adjustment circuit 14 and a phase-adjusted output signal therefrom is supplied to a pulse shaping circuit 15, which produces a pulse signal 5 having a duty factor of 50% synchronized with the rotations of the rotary magnetic heads 21 and 22. The pulse signal S is applied to a phase comparator 11 which phase-compares it with a reference signal from a reference signal generator 10 to produce an error signal representing a phase difference therebetween. The reference signal generated by the reference signal generator 10 has a frequency equal to a frame frequency of the video signal. The error signal representing the phase reference is supplied to the disc motor 4 through a disc servo control circuit 12 so that servo control is effected such that he pulse signal S is phase-synchronized with the reference signal. As a result, the rotary magnetic heads 21 and 22 are rotated at a rotating speed corresponding to the same frame frequency as that in a record mode.

The multiplexed video signal and pilot signals reproduced from the magnetic tape 1 by the rotary magnetic heads 21 and 22 whose rotations are controlled are supplied to a reproduction processing circuit 20 through well-known means such as a rotary transformer, not shown. In the apparatus having the two rotary magnetic heads, signals are alternately reproduced for each field by the two magnetic head and a switching circuit (not shown) is controlled by the pulse signal S from the pulse shaping circuit 15 to convert the alternate output signals from the two heads into a serial signal. This switching circuit is contained in the reproduction processing circuit 20. In the reproduction processing circuit 20, the video signal component and the pilot signal component are separated by well-known means such as a filter circuit. The separated video signal is outputted to a terminal 100 and it is further processed as required to produce an image representing signal. The separated pilot signal $P_o$ is supplied to a frequency converter 31, which mixes the reproduced pilot signal $P_o$ with a local pilot signal $P_1$ generated by a pilot signal generator 50 to produce a differential frequency component therebetween.

In a standard speed playback mode. The pilot signal generator 50 generates the local pilot signals having the same frequencies as those of the pilot signals generated in the recording mode and cyclically and repeatedly switched for each field in the order of $f_1$, $f_2$, $f_3$, $f_4$. Since the timing of the frequency switching is controlled by the pulse signal S produced by the pulse shaping circuit 15, it is synchronized with the time point at which the rotary head which traces the record track is switched. Several differential frequency components appear at the output of the frequency converter 31 depending on the tracking status of the rotary head. Of those, the signal components $f_H$ and $3f_H$ are detected by a $f_H$ detector 32 and a $3f_H$ detector 33 having tank circuits which resonates at the frequencies of $f_H$ and $3f_H$, respectively, and envelope detectors.

When the magnetic head 21 traces the track $A_3$ of the record tracks shown in FIG. 1 on which the pilot signal of the frequency $f_1$ is recorded, if the tracking is correct, the frequency of the local pilot signal generated by the pilot signal generator 50 is $f_1$ and the differential frequency component between the major reproduced pilot signal $P_o$ and the local pilot signal $P_1$ is substantially zero. A small differential frequency component between the pilot signals from the adjacent tracks due to the crosstalk and the local pilot frequency appears. If the magnetic head 21 is shifted toward the adjacent track $B_3$ from the center of the tack $A_3$ by the tracking error, the frequency $f_2$ component in the reproduced pilot signal $P_o$ increases and the component of the difference between $f_1$ and $f_2$ ($6.5f_H - 7.5f_H = f_H$) in the output of the frequency converter 31 increases. Conversely, if the magnetic head 21 is shifted toward the track $B_2$, the frequency $f_4$ component in the reproduced pilot signal $P_o$ increases and the component of the difference between $f_1$ and $f_4$ ($6.5f_H - 9.5f_H = 3f_H$) increases.

After one track of scan, the magnetic head 22 scans the track $B_3$ on which the frequency $f_2$ is recorded. At this time, the local pilot signal generated by the pilot signal generator 50 is switched to the frequency $f_2$. Thus, if the magnetic head 22 is shifted toward the adjacent track $A_4$ from the center of the track $B_3$ by the tracking error, the frequency $f_3$ component in the reproduced pilot signal increases and the component of the difference between $f_2$ and $f_3$ ($7.5f_H - 10.5f_H = 3f_H$) increases. If the magnetic head 22 is shifted toward the adjacent track $A_3$, the frequency $f_1$ component in the reproduced pilot signal increases and the component of the difference between $f_2$ and $f_1$ ($7.5f_H - 6.5f_H = f_H$) increases.

In this manner, the magnitudes of the output signals E and F from the $f_H$ detector 32 and the $3f_H$ detector 33 change depending on the tracking error. The $f_H$ component detection signal E and the $3f_H$ component detection signal F are supplied to a differential amplifier 34 and a difference therebetween is amplified. The differential amplifier 34 amplifies the difference between the signals E and F. The pulse signal S from the pulse shaping circuit 15 which is switched for each field is supplied to the differential amplifier 34 so that it alternately produces a signal E−F and an opposite polarity signal F−E for each field. As a result, when the magnetic head 21 scans the magnetic tape, the difference $F(3f_H)-E(f_H)$ between the $3f_H$ component output signal F of the $3f_H$ detector 33 and the $f_H$ component output E of the $f_H$ detector 32 is amplified, and when the magnetic head 22 scans the magnetic tape, the opposite polarity signal $E(f_H)-F(3f_H)$ is amplified. The output of the differential amplifier 34 is smoothened by a low-pass filter 35, and in the standard speed playback mode, it is supplied to an adder 36 through a switch 52 which selects a contact X. A signal representing the rotating speed of the capstan motor 5 for controlling the rotating speed is also supplied to the adder 36, which adds the signal representing the tracking status of the rotary head to the signal representing the rotating speed of the capstan motor 5 and a resulting sum signal is applied to a motor driver 37, which drives the capstan motor 5 and a frequency generator 6 generates a signal of a frequency representing the rotating speed of the capstan motor 5. The frequency signal representing the rotating speed is supplied to a frequency discriminator 38 through a switch 53 which selects a contact X in the standard speed playback mode. If the rotating speed of the capstan motor 5 deviates from the rotating speed corresponding to the frequency determined by the frequency discriminator 38 and the frequency generator 6, the frequency discriminator 38 produces an error signal representing the deviation of the rotating speed. This error signal is fed back to the motor driver 37 through the adder 36 so that the capstan motor 5 is controlled to rotate at the constant speed. As a result, the magnetic tape 1 is transported at the predetermined standard speed. The tracking error signal from the differential amplifier 34 derived from the reproduced pilot signal is also applied to the servo control loop of the capstan motor 5 and the rotating speed of the capstan motor 5 is controlled to minimize the error signal. In this manner, the tracking servo control is effected.

The control to the magnetic tape speed and the tracking in the standard speed playback mode is same as the known control method which uses the pilot signal.

A characteristic feature of the present invention resides in the control of the magnetic tape speed when the magnetic tape speed in the playback mode is different from that in the recording mode. This is explained below.

In FIG. 2, a configuration added to servo-control the magnetic tape transport in the variable speed playback mode comprises a rectangular wave shaping circuit 40 connected to an output terminal of the differential amplifier 34 which produces the tracking error signal, a frequency divider 42 for frequency-dividing an output of the rectangular wave shaping circuit 40, and a phase comparator 43 for detecting a phase difference between an output of the frequency divider 42 and a reference signal. In order to effect the control by those circuits, the switches 52 and 53 are provided, which select contacts Y in the variable speed playback mode.

The operation of the embodiment shown in FIG. 2 when the magnetic tape is transported at a speed five times as high as the standard speed in the same direction as that of the normal playback mode is now explained. When the variable speed playback operation is commanded by a control unit not shown, a speed switching signal is applied through an input terminal $T_1$ to the motor driver 37 which drives the capstan motor 5 so that the rotating speed of the capstan motor 5 is switched. At the same time, the switches 52 and 53 are switched by the variable speed playback command to select the contacts Y. In the variable speed playback mode, the pilot signal generator 50 responds to a mode specifying signal Z applied to a control signal input terminal $T_2$ to generate the local pilot signal $P_1$ having the frequencies which are switched in a different order than that in the normal playback mode. In the normal playback mode, the frequencies of the local pilot signal $P_1$ are switched in the order of $f_1, f_2, f_3, f_4, f_1, f_2, \ldots$ in synchronism with the pulse signal S produced by the pulse shaping circuit 15, but in the variable speed playback mode, the frequencies are switched in the reverse order, that is, in the order of $f_4, f_3, f_2, f_1, f_4, f_3, \ldots$ as shown in FIG. 3b. As shown in FIGS. 3a and 3b, when the pulse signal S is at a high level "H", that is, when the magnetic head 21 scans the magnetic tape, the local pilot signal has the frequency $f_4$ or $f_2$, and when the pulse signal S is at a low level "L", that is, when the magnetic head 22 scans the tape, the local pilot signal has the frequency $f_3$ or $f_1$, and the frequencies are cyclically and repeatedly switched as shown in FIG. 3b. The local pilot frequency having the frequency thereof switched in the reverse order to that in the normal playback mode is supplied to the frequency converter 31 where it is mixed with the pilot signal reproduced from the magnetic tape and a differential frequency component therebetween is produced.

An embodiment of the pilot signal generator 50 which switches the frequency of the local pilot signal in the variable speed playback mode in the different order than that in the standard speed playback mode is shown in FIG. 4, in which the pulse signal from the pulse shaping circuit 15 is applied to a terminal 110. A terminal 130 is an output terminal of the local pilot signal $P_1$. Numerals 71 to 74 denote oscillators which are sources of the local pilot signals having the predetermined frequencies $f_1$ to $f_4$. One of the outputs of the oscillators 71 to 74 is sequentially selected by AND gates 57 to 60, which are controlled by a circuit comprising flip-flops 51 and 52, AND gates 53 to 56, EOR gates 62 to 64 and inverters 65 to 68.

In the variable speed playback mode, the "H" level mode specifying signal Z is applied to the input terminal $T_2$, and in the other modes including the standard playback mode, the "L" level mode specifying signal Z is applied. Accordingly, in the normal standard speed playback mode, the input terminal $T_2$ is at the "L" level and an output of the inverter 66 is "H" and the EOR gates 62 and 63 function as inverters. The EOR gate 64 functions as a mere buffer and the flip-flop 51 is triggered by a fall of the pulse signal S supplied to the terminal 110. Because of the provision of the inverter 65, the flip-flop 52 is triggered by a rise of the pulse signal S. By the outputs of the flip-flops 51 and 52, the AND gates 53 to 56 cyclically gate the "H" level signals in the order of 53, 54, 55 and 56 in synchronism with the pulse signal S. As a result, the AND gates 57, 58, 59 and 60 are sequentially opened in this order so that the outputs of the oscillators 71-74 are sequentially gated to produce the local pilot signal whose frequency is switched in the order of $f_1, f_2, f_3$ and $f_4$, through an OR gate 61.

In the variable speed playback mode, the mode specifying signal Z is at the "H" level and the output of the inverter 66 is at the "L" level. Thus, the EOR gates 62 and 64 function as mere buffers while the EOR gate 64 functions as an inverter. As a result, the flip-flop 51 is triggered by the rise of the pulse signal S and the flip-flop 52 is triggered by the fall of the pulse signal S.

Thus, the AND gates 53–56 cyclically gate the "H" level signals in the opposite order, that is, in the order of 56, 55, 54 and 53. As a result, the AND gates 60, 59, 58 and 57 are opened in this order and the local pilot signal whose frequency is switched in the order of $f_4$, $f_3$, $f_2$ and $f_1$ is gated and supplied through the OR gate 61.

Scan locii of the magnetic head when the magnetic tape is transported at the speed five times as high as the standard playback speed are shown in FIG. 1. Of the hatched tracks encircled by broken lines, A' indicates the scan locus of the magnetic head 21 and B' indicates the scan locus of the magnetic head 22. FIG. 3 shows signal waveforms in the operation. FIG. 3d shows a relation between the track scanned by the magnetic head and the frequency of the pilot signal reproduced therefrom. FIG. 3e shows a waveform of a video signal U reproduced by the magnetic heads 21 and 22 from the magneitc tape. It shows that the reproduced output is reduced by scanning the recorded track by the head having a different azimuth angle than that of the head by which the signal was recorded on that track. N indicates a minimum level of the output. At the point N, the recorded signal is observed as a noise band or a display screen which displays the reproduced signal. As shown in FIG. 1, when the magnetic head 21 scans the trace locus A', that is, when the pulse signal S shown in FIG. 3a is "H", the magnetic head 21 scans the five tracks $A_0$, $B_0$, $A_1$, $B_1$ and $A_2$ in this order as shown in FIG. 3d. The next magnetic head 22 scans the trace locus B' so that it scans the five tracks $B_2$, $A_3$, $B_3$, $A_4$ and $B_4$ in this order. Then, the magnetic head 21 again scans the tracks $A_5$, $B_5$, $A_6$, $B_6$ and $A_7$. In this manner, the tracks are sequentially scanned five by each head. Thus, the reproduction processing circuit 20 sequentially produces the pilot signal $P_o$ of the frequencies $f_3$, $f_4$, $f_1$, $f_2$, $f_3$, $f_4$, $f_1$, ... as shown at the bottom of FIG. 3d. On the other hand, the pilot signal generator 50 generates the local pilot signal $P_1$ of the frequencies $f_4$, $f_3$, $f_2$, $f_1$, ... which are switched in the opposite order to that of the pilot signal $P_o$, as shown in FIG. 3b. Those two pilot signals $P_o$ and $P_1$ are supplied to the frequency converter 31 which produces a differential frequency component therebetween. If the frequencies of the pilot signal are selected to those described above when the differential frequency is equal to $f_H$, the output of the $f_H$ detector 32 is maximum when the frequencies $f_3$ and $f_4$ or the frequencies $f_1$ and $f_2$ are inputted. The $f_H$ component is maximum when the local pilot signal frequency is equal to $f_4$ and the tracks $A_0$ and $A_2$ which result in the reproduced pilot signal frequency $f_3$ are scanned, when the local pilot signal frequency is equal to $f_3$ and the tracks $B_2$ and $B_4$ which result in the reproduced pilot signal frequency $f_4$ are scanned, when the local pilot signal frequency is equal to $f_2$ and the tracks $A_5$ and $A_7$ which result in the reproduced pilot signal frequency $f_1$ are scanned, and when the local pilot signal frequency is equal to $f_1$ and the tracks $B_7$ and $B_9$ which result in the reproduced pilot signal frequency $f_2$ are scanned. When the tracks $A_1$, $B_3$, $A_6$, $B_8$, ... which are farthest from those tracks are scanned, the output of the $f_H$ detector 32 is minimum. Accordingly, the $f_H$ detector 32 produces a signal wave which is the repetition of a waveform E shown in FIG. 3f. A repetition frequency is twice as large as that of the pulse signal S as is apparent from FIG. 3.

Similarly, the output of the $3f_H$ detector 33 is maximum when the difference between the local pilot signal frequency and the reproduced pilot frequency is equal to $3f_H$, that is, when those frequencies are $f_1$ and $f_4$ or $f_2$ and $f_3$. Thus, the output is maximum when the track $A_1$, $B_3$, $A_6$, $B_8$, ... is scanned, and minimum when the track $A_0$, $A_2$, $B_2$, $B_4$, $A_5$, $A_7$, $B_7$, $B_9$, ... is scanned. The output of the $3f_H$ detector 33 is shown by a waveform F in FIG. 3g, which is an exact inversion of the output E of the $f_H$ detector 32 shown in FIG. 3f.

The outputs E and F of the $f_H$ detector 32 and the $3f_H$ detector 33 are supplied to the differential amplifier 34, which alternately amplifies the differences (E−F) and (F−E) between the outputs E and F in response to the pulse signal S synchronized with the rotation of the rotary head in the standard speed playback mode, but in the variable speed playback mode, the switching is stopped by a control signal which is issued in response to the variable speed playback command and applied to the terminal $T_3$ so that the difference (E−F), for example, is always amplified. In the standard speed playback mode, the frequency relation between the detection signals $f_H$ and $3f_H$ which are derived from the pilot signals reproduced from the currently reproduced track and the adjacent track is inverted for each switching of the tracks. Accordingly, the output of the differential amplifier 34 is to be alternately switched. For example, a circuit which selects the signal routed to a phase inverter and the signal not routed to the phase inverter in response to the pulse signal S is provided. In order to stop the switching in the variable speed playback mode, the application of the pulse signal S may be stopped and a constant level potential is applied, or a terminal which always produces one of the difference signals, for example, (E−F) may be provided and this terminal may be selected in the variable speed playback mode.

As shown in FIG. 3h, the output G of the differential amplifier 34 is similar to the waveform E shown in FIG. 3f or the waveform F shown in FIG. 3g. The frequencies of those signals E, F and G are equal and the frequency $f_n$ thereof is represented as follows when the magnetic tape is transported for the playback at a speed n times (n being an integer) as high as and in the same direction as those in the standard speed playback mode.

$$f_n = f_s \times (n-1)/2 \qquad (2)$$

where $f_s$ is the frequency of the pulse signal S synchronized with the rotation of the rotary heads.

Accordingly, when the magnetic tape is transported at the speed five times as high as the standard speed, $f_n = 2f_s$ and the frequency $f_n$ is two times as high as that of the pulse signal S as shown in FIG. 3.

The output signal G is supplied to the rectangular wave shaping circuit 40 where an A.C. component is amplified to produce a square wave signal H as shown in FIG. 3i. The rectangular wave signal H is supplied to the frequency divider 42, which frequency-divides the input signal by a factor of (n−1)/2. In the five times speed playback mode, it frequency-divides by the factor of two. Thus, it produces an output J as shown in FIG. 3j. The frequency-division factor of the frequency divider 42 is switched by applying a speed switching signal in the variable speed playback mode produced by speed setting means (not shown) to a terminal $T_4$. The speed setting in the variable speed playback mode is selected from a certain number of predetermined speeds and the frequency division factor is selected in accordance with the speed setting. The switching of the frequency division factor may be effected by well-known pulse circuit technique and hence specific means is not explained here.

As seen from FIG. 3, the frequency of the output signal J of the frequency divider 42 is equal to the frequency $f_s$ of the pulse signal S, and the output signal J is supplied to the phase comparator 43 where it is phase-compared with the reference signal from the reference signal generator 10. An error signal representing a phase difference therebetween is supplied to the adder 36 through the switch 52 which now selects the contact Y.

The output signal H of the rectangular wave shaping circuit 40 is supplied to the frequency divider 42 as well as to the frequency discriminator 38 through the switch 53 which now selects the contact Y. The frequency discriminator 38 produces a signal of an amplitude representing the frequency of the signal H and this signal is supplied to the adder 36. The adder 36 sums the signal representing the frequency of the signal H and the error signal from the phase comparator 43 and a sum signal is applied to the motor driver 37 to control the speed and the phase of the capstan motor 5. Thus, the frequency $f_n$ of the output signal G of the differential amplifier 34 (or the outputs E and F of the $f_H$ detector 32 and the $3f_H$ detector 33) is controlled to be the constant defined by the equation (2) and the tape transport is controlled such that the output signal J of the frequency divider 42 is phase-synchronized with the output signal of the reference signal generator 10. Since the pulse signal S representing the rotating speed of the rotary heads is phase-synchronized with the reference signal of the reference signal generator 10, the pulse signal S and the output signal G of the differential amplifier 34 are synchronized. As a result, the minimum points N of the reproduced signal which appear as the noise band on the display screen are fixed on the screen and hence a stable image is displayed.

In the above description, the local pilot signal generated by the pilot signal generator 50 in the variable speed playback mode has the frequency $f_4$ or $f_2$ when the pulse signal S is "H" and $f_3$ or $f_1$ when the pulse signal S is "L" (see FIGS. 3a and 3b). Alternatively, as shown in FIG. 3c, a local pilot signal $P_1'$ may be generated in which the order of the frequencies is $f_4$, $f_3$, $f_2$, $f_1$, $f_4$, $f_3$, . . . and the frequency $f_3$ or $f_1$ is generated when the pulse signal S is "H" and the frequency $f_4$ or $f_2$ is generated when the pulse signal S is "L". In this case, the output signals E', F' and G' of the $f_H$ detector 32, the $3f_H$ detector 33 and the differential amplifier 34 are phase-shifted from the output signals E, F and G as shown by broken lines in FIGS. 3f, 3g and 3h, but only the position of the noise band is shifted and the tape transport is controlled in the same manner as that described above. In order to generate such a local pilot signal $P_1'$, the EOR gate 64 shown in FIG. 4 is omitted and the pulse signal S applied to the terminal 110 is directly supplied to the $\phi$ input terminal of the flip-flop 51 and the inverter 65.

In the embodiment shown in FIG. 2, in the variable speed playback mode, the frequencies of the local pilot signal generated by the pilot signal generator 50 are switched in the reverse order to that of the frequencies of the pilot signal generated in the recording mode and the difference between the outputs of the $f_H$ detector 32 and the $3f_H$ detector 33 is detected by the differential amplifier 34 by subtracting the output of one detector from the output of the other detector. However, this is not always necessary to control the tape transport in the variable speed playback mode. For example, the pilot signal generator 50 may generate the frequencies in the same order as that in the recording mode as is done in the standard speed playback mode and the differential amplifier 34 may alternately produce the differences of the output of the $f_H$ detector 32 from the output of the $3f_H$ detector 33 and vice versa in synchronism with the pulse signal S. In this manner, the advantage of the present invention is equally attained. However, such switching of the differential amplifier 34 may result in a variation of a D.C. component depending on a circuit status and this variation may cause a malfunction when it is detected as a signal. Accordingly, as shown in the embodiment, by switching the frequencies of the local pilot signal in the reverse order and stopping the switching of the differential amplifier, the variation of the D.C. component is eliminated and the differential amplifier need not take care of the difference between the D.C. levels of the detectors.

The operations in the standard speed playback mode and the playback mode in which the tape is transported at the n times speed in the same direction have been described. The present invention is also applicable to a playback mode in which the tape is transported at m times speed (m being an integer) in the opposite direction. The operation in the reverse variable speed playback mode is now explained.

Referring to FIG. 2, when the reverse variable speed playback mode is commanded, a motor reverse rotation command signal and the speed switching signal are applied to the motor driver 37 from the control unit, not shown, through the terminal $T_1$. As a result, the capstan motor 5 is rotated in the reverse direction to that in the normal playback mode to transport the magnetic tape 1 reversely. The other circuits operate in the same manner as that described above. A playback operation in which the tape is transported reversely at a speed three times as high as the standard speed is specifically explained below.

The scan locus of the magnetic head 21 when the tape is transported in this manner is shown by broken lines A" in FIG. 1 and the scan locus of the magnetic head 22 is shown by broken lines B". FIG. 4 shows waveforms generated during the scans. When the magnetic head 21 scans the track locus A", it sequentially scans the record tracks $A_5$, $B_4$, $A_4$, $B_3$ and $A_3$ as shown in FIG. 5c. When the magnetic head 22 scans the track locus B", it sequentially scans the record tracks $B_3$, $A_3$, $B_2$, $A_2$ and $B_1$. Thus, the pilot signal $P_o$ reproduced by the reproduction processing circuit 20 has the frequencies switched in the order of $f_4$, $f_3$, $f_2$ and $f_1$, that is, the frequencies thereof change in the order of $f_1$, $f_4$, $f_3$, $f_2$, $f_1$, $f_2$, $f_1$, $f_4$, $f_3$, $f_2$, . . . and the pilot signals of two frequencies repeatedly reproduced in the vicinity of the head switching point. In the example shown in FIG. 5c, the pilot signals of the frequencies $f_2$ and $f_1$ are repeatedly reproduced at the switching point from the track locus A" to the track locus B".

The reproduced pilot signal $P_o$ is frequency-converted by the frequency converter 31 in accordance with the local pilot signal $P_1$ generated by the pilot signal generator 50 which generates the frequencies $f_4$, $f_3$, $f_2$ and $f_1$ in this order (FIG. 5 shows the waveforms after the capstan motor has been controlled to exhibit a stable state.) As a result, the differential amplifier 34 produces a maximum output as shown by a waveform G in FIG. 5e when the track which results in large $f_H$ or $3f_H$ component in the output of the frequency converter 31 is scanned. The signal G is a cyclic waveform having a substantially continuous phase. A repetition frequency $f_m$ thereof is represented as follows.

$$f_m = f_s \times (m+1)/2 \qquad (3)$$

In the example shown in FIG. 5, m=3 and the frequency $f_m$ of the signal G is equal to twice of the frequency $f_s$ of the pulse signal S. Thus, by applying the output signal G of the differential amplifier 34 to the rectangular wave shaping circuit 40 to shape it to a rectangular wave (FIG. 5f) and frequency-dividing it by a factor of two by the frequency divider 42, the same frequency as the frequency $f_s$ of the pulse signal S is produced. The signal J is supplied to the phase comparator 43 and the servo control is effected in the same manner as that described above and the tape transport is controlled to synchronize with the pulse signal S. As a result, the noise band is fixed on the display screen and the stable reverse tape transport is attained. The frequency division factor of the frequency divider 42 in the reverse playback mode is selected from preset factors determined by ratios of the playback tape speeds to the standard speed, in accordance with the switching of the tape transport speed.

Since the frequency of the output signal G from the differential amplifier 34 changes with the switching of the tape speed in the variable speed playback mode, the frequency of the signal H which is derived by shaping the signal G also changes with the tape speed. This signal H is applied to the frequency discriminator 38. Since the frequency of the signal H is determined by the tape speed in accordance with the formula (3) and it is previously known, a center frequency of the frequency discriminator 38 is switched in accordance with the switching of the tape speed by known means not shown.

In the above embodiments, the tape is transported at the speed which is an odd multiple (n=5, m=3) of the standard speed. The present invention is not limited to the playback at the odd multiple of the tape speed but it is also applicable to the variable speed playback at an even multiple tape speed.

In general, in order to allow the present invention to be applied to the variable speed playback at any speed, the following measures are taken. In the variable speed playback mode, the formulas (2) and (3) are met for the tape speed of either even multiple speed or odd multiple speed. Thus, the frequency of the output signal H from the rectangular wave shaping circuit 40 is doubled by a doubler and the doubled frequency is frequency-divided by the factor of (n−1) in the playback mode in which the tape is transported in the same direction as that in the normal playback mode, and by the factor of (m+1) in the reverse playback mode. As a result, the frequency of the output signal J from the frequency divider is equal to the frequency $f_s$ of the pulse signal S and the servo control is effected.

While not shown, the following modifications of the embodiment of FIG. 2 may be used to control the tape transport speed in the variable speed playback mode.

In one modification, the tape speed can be stably controlled even if an S/N ratio of the reproduced pilot signal is not sufficiently high. To this end, in the variable speed playback mode, the output of the frequency generator 6 which represents the rotating speed of the capstan motor, instead of the output signal H of the rectangular wave shaping circuit 40, is supplied to the frequency discriminator 38. (The switch 53 is not switched.)

In another modification, since the output E of the $f_H$ detector 32 and the output F of the $3f_H$ detector 33 have the similar waveforms as and the same frequencies those of the output G of the differential amplifier 34, the output E or F, instead of the output G is applied to the rectangular wave shaping circuit 40.

In a further modification, since the reference signal generated by the reference signal generator 10 and the pulse signal S generated by the pulse shaping circuit 15 are phase-synchronized, the pulse signal S from the pulse shaping circuit 15, instead of the output of the reference signal generator 10 is supplied to the phase comparator 43 as the reference signal. Alternatively, the output of the phase adjustment circuit 14 which is the source of the pulse signal S, or the signal from the head 13 may be supplied to the phase comparator 43 as the reference signal.

We claim:

1. A magnetic tape transport controller for a magnetic recording and reproducing apparatus wherein a pilot signal for tracking control having four different frequencies cyclically switched in a predetermined time sequence for each record track is recorded by a rotary magnetic head on a magnetic tape in superposition to an information signal and the magnetic tape is transported in a playback mode at a different tape speed than that in a recording mode, comprising:
pilot signal generating means for generating a local pilot signal having the same four frequencies as those of the recorded pilot signal;
frequency conversion means for frequency-converting the pilot signal reproduced from the magnetic tape in accordance with the local pilot signal;
detection means for extracting a specific frequency component from the output signal of said frequency conversion means and detecting an amplitude thereof; and
control means responsive to the output of said detection means for controlling the transport speed of the magnetic tape such that a repetition frequency of the output signal of said detection means is maintained at a constant frequency determined by the tape speed in the playback mode.

2. A magnetic tape transport controller according to claim 1 wherein said pilot signal generating means generates the frequencies in the variable speed playback mode in the opposite generation time sequence to that of the frequencies of the pilot signal in the recording mode.

3. A magnetic tape transport controller according to claim 1 wherein said control means for controlling the transport speed of the magnetic tape includes frequency division means for frequency-dividing the output signal of said detection means by a factor determined by the tape speed in the playback mode, phase comparison means for phase-comparing the output signal of said frequency division means and a reference signal to produce a phase error signal, frequency discrimination means for discriminating the frequency of the output signal of said detection means to produce a frequency error signal representing a difference from a predetermined frequency, and motor drive means for controlling rotation of a capstan motor in accordance with the phase error signal and the frequency error signal.

4. A magnetic tape transport controller according to claim 3 wherein a doubling means is provided to double the output of said detection means, and said frequency-division means frequency-divides the output signal of said doubling means by a frequency division factor of (n−1) when the tape speed in the variable speed playback mode is n (n being an integer) times as high as that in a standard speed playback mode, and frequency-divides the output of said doubling means by a factor of (m+1) when the tape is transported in the reverse direction at a speed m (m being an integer) times as high as that in the standard speed playback mode.

5. A magnetic tape transport controller according to claim 4 wherein said frequency division means includes a frequency divider for frequency-dividing the detection signal by the factor of (n−1)/2 or (m+1)/2 when n or m is an odd number.

* * * * *